United States Patent [19]

Poehlmann et al.

[11] Patent Number: 4,763,957
[45] Date of Patent: Aug. 16, 1988

[54] BICYCLE HUB CONSTRUCTIONS AND LUBRICATION THEREOF

[75] Inventors: Paul W. Poehlmann, Stinson Beach; Mark J. Slate; Stephen M. Potts, both of Mill Valley; Charles B. Cunningham, Fairfax, all of Calif.

[73] Assignee: Wilderness Bicycle, Inc., Corte Madera, Calif.

[21] Appl. No.: 926,340

[22] Filed: Nov. 3, 1986

[51] Int. Cl.⁴ .............................................. B60B 27/00
[52] U.S. Cl. ................................ 301/105 B; 301/111; 301/125; 384/474; 411/273
[58] Field of Search ........ 301/105 R, 105 B, 111-112, 301/124 R, 124 H, 125; 280/279, 288; 384/44, 380, 381, 474; 403/22, 320; 411/272, 273, 351, 432

[56] References Cited

U.S. PATENT DOCUMENTS

| 2,677,984 | 5/1954 | Juy | 280/288 X |
|---|---|---|---|
| 2,926,968 | 3/1960 | Toth | 384/321 |
| 3,922,018 | 11/1975 | Shook | 301/105 B |
| 4,400,038 | 8/1983 | Hosokawa | 301/125 X |
| 4,440,451 | 4/1984 | Goodell et al. | 301/105 R |
| 4,492,416 | 1/1985 | Kaufmann | 384/474 |

FOREIGN PATENT DOCUMENTS

| 928369 | 6/1973 | Canada | 384/474 |
|---|---|---|---|
| 890344 | 2/1962 | United Kingdom | 384/474 |

Primary Examiner—Robert B. Reeves
Assistant Examiner—Russell D. Stormer
Attorney, Agent, or Firm—Lothrop & West

[57] ABSTRACT

The forks of a bicycle receive an axle having threaded ends. A tube surrounds the axle and carries ball bearings on which a wheel housing is rotatable with a space between the tube and the housing. Specially shaped seals engage the wheel housing and the tube between the ball bearings to keep lubricant out of the space between the seals. A special lever lock on one end of the axle cooperates with a nut on the other end of the axle to draw together the parts engaged with the axle, the tube and the housing.

3 Claims, 7 Drawing Sheets

BICYCLE HUB CONSTRUCTIONS AND LUBRICATION THEREOF

BRIEF SUMMARY OF THE INVENTION

For bicycles having spaced forks with openings, we provide hub constructions each including an axle having threaded ends extending through the openings. A tube closely surrounds the axle and is specially located relative to the forks. A cylindrical housing surrounds and is spaced from the tube by an axially separated pair of ball bearings. The ball bearing inner races engage the tube, and the outer races engage the cylindrical housing. The housing has end flanges receiving the customary spokes and at each end has shoulders in part defining axially spaced chambers. A pair of circular seals having flexible portions are disposed in the respective chambers. Between them, the cylindrical housing and the tube define an isolated central chamber. There are passages to conduct lubricant to the ball bearings, particularly between the bearings and the seals. There are cups and a nut at the tube ends for locating the tube axially with respect to the forks. There is a nut on one end of the axle and abutting one fork, and there is a nut block at the other end of the axle urging a washer against the adjacent fork under the influence of an eccentric pivot lever held in position by a springurged latch lever.

The construction shown herein is also applicable to the bottom bracket assembly, headset assembly, pedal assembly, freewheel and derailleur assembly, etc. of vehicles comparable to bicycles.

DESCRIPTION OF THE PREFERRED EMBODIMENTS

One of the customary embodiments of the present concepts is particularly shown in FIGS. 1–7, in which there is a customary pair of bicycle front forks 6 and 7, each having an end slot 8 or opening therein. Extending through both openings 8 is an axle 9 symmetrical about an axis 11 and having threaded ends 12 and 13. The end 12 receives a nut 14. Also slipped over the end 12 is a cup 16 having a flange 17 interposed between the fork 7 and a tube 18 fitting coaxially over the axle 9. A similar cup 19 fits over the tube and is interposed between the end of the tube and the fork 6. A washer 21 is on the axle 9 against the outside of the fork 6.

Threads on the end 13 receive a special tensioning device. This includes a nut block 22 (see FIGS. 6 and 7) threaded into chosen position. The block 22 has a pair of side grooves 23 leading to transverse openings defining arcuate ends 24. The grooves 23 and ends 24 receive aligned pins 26 of a fastening lever 27 thus pivotally mounted on the block 22. The lever 27 is bifurcated and receives a latch 28 mounted on a cross pin 29 and urged by a spring 31 into a holding position. The flat lower end 32 of the latch 28 seats on the flat top 33 of the block 22. Near its pins 26, the lever 27 carries a pair of eccentric cams 36. When the lever 27 is in the positon shown in FIGS. 2 and 3, eccentric cams press against the washer 21 and thus draw the axle 9 toward the left in FIG. 2. By a quick cam action, this affords a tight abutment of the cups 16 and 19 with the axle tube 18 and the forks 6 and 7 to provide a set, but adjustable, assembly and an easy release.

On the axle tube 18 and adjacent the cups 16 and 19 are standard ball bearings 38 and 39. All standard ball bearings herein, whether or not so illustrated, each include (see FIGS. 10 and 13) an inner race 41, an outer race 42, a number of balls 43 between the races, and a retaining cage 44 to keep the balls properly spaced. The bearing 38 is pressed against a shoulder stop in the end of a surrounding housing 46 of tubular form and having end flanges 47 which carry the spokes 48 of the customary wheel (not shown). The bearing 39 is not tightly pressed into the tubular housing 46, but is provided with a circumferential band 49 of unset adhesive (see FIG. 8). The bearing 39 can be pushed into (see FIG. 9) and will hold any desired axial location in the tubular housing when the adhesive sets.

The present constructions are especially adapted for use in very light, easy running, low friction bicycles. It has been noted that one of the frictional drags in the ordinary mechanism is imposed by lubricant, sometimes a large body of heavy lubricant, subject to internal eddies and the like interposed between and wetting the axle and the surrounding housing. Consequently, in accordance with the present invention, particular care is taken to obviate as much of the drag between axle and housing as possible. The bearings 38 and 39, being well lubricated, are especially isolated from the annular volume 51 between the outside of the tube 18 and the inside of the housing 46.

Seated in shouldered chambers 52 in the interior of the housing 46 are lubricant seals 53. These are of flexible or resilient material forming a circumferential seal band 54 designed to seat in the chamber 52. A seal cone 57 at one end merges with the band 54 and at the other end frictionally runs on the tube 18. The seals 53 keep the space or volume 51 lubricant-free. This greatly reduces the drag between the housing 46 and the relatively rotating tube 18.

For use in supplying lubricant to the bearings, there are provided special lubricating channels 58. These extend from the exterior of the tubular housing 46 to the outer margin of the seal bands 54. The seal bands act as flexible, flap valves and yield as lubricant is introduced under pressure. When the lubricant inlet pressure ceases, the distorted portions of the seal bands 54 then return to normal and prevent backflow of lubricant. In this fashion, the volume 51 is kept relatively dry and the bearings 38 and 39 are adequately and uniformly lubricated throughout the interior all around the bearings.

Substantial escape of lubricant is prevented, but some peripherally uniform escape of used lubricant is permitted, if desired, for flushing or purging, by providing each bearing 38 and 39 with an annular, slightly yieldable plate 59 seated in a groove in the outer race 42 and leaving the inner margin of the plate 59 free to release small amounts of lubricant under pressure.

Figure 11:
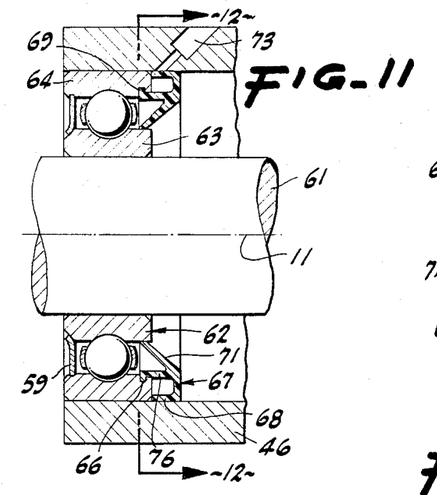
FIG. 11 is a fragmentary view comparable to the left end of FIG. 9 but showing a modified seal.
Figure 12:
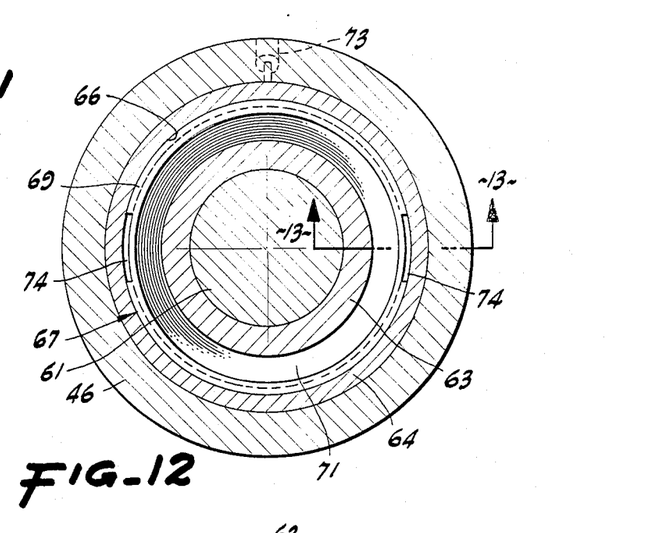
FIG. 12 is a cross-section, the plane of the view being indicated by the lines 12—12 of FIG. 11.
Figure 13:
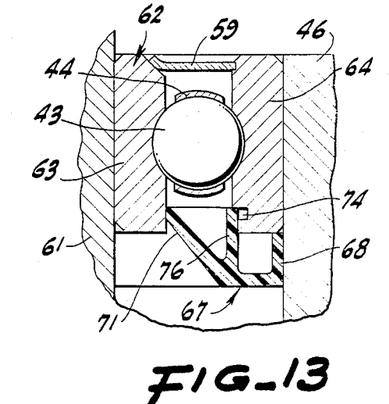
FIG. 13 is a cross-section on an enlarged scale, the plane of section being on the line 13—13 of FIG. 12.

Shown in FIGS. 11, 12 and 13, there is a variation in the manner of mounting the seals with respect to the adjacent bearings. The surrounding structures remain as before. An axle 61 carries a ball bearing 62 having an inner race 63 and an outer race 64 with an inwardly facing groove 66. Disposed alongside and inwardly of the outer race 64 is a seal ring 67 having an annular outer flange 68. A center flange has a bead 69 seated in the groove 66. The seal ring 67 has a conical member 71 seated against the inner race 63. The outer flange 68 is disposed to overlie a lubricant opening 73 in the housing. The bead 69 is interrupted at two opposite points by notches 74 to allow inward deflection of those parts of the central flange 76 of the seal adjacent the notches.

To lubricate the bearing, a lubricant pressure tool is put at the opening 73. Lubricant flows and deflects the outer flange 68 of the seal. Lubricant flow then divides and surrounds the central flange 76 and at ninety degrees from the entrance point deflects the central flange inwardly near the notches 74 and thus gains access to the vicinity of the ball bearing 62, the lubricant being confined to the bearing by a standard seal plate 59.

Figure 14:
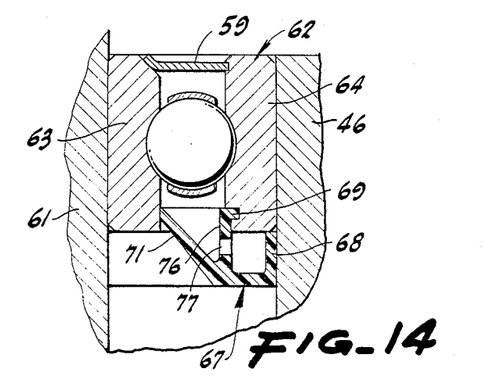
FIG. 14 is a view like FIG. 13 but with a modified seal.

The FIG. 14 version is similar except that the notches are not used. Instead, a pair of openings 77 in the central flange 76 permit lubricant flow throughout all of the bearing.

Figure 1:
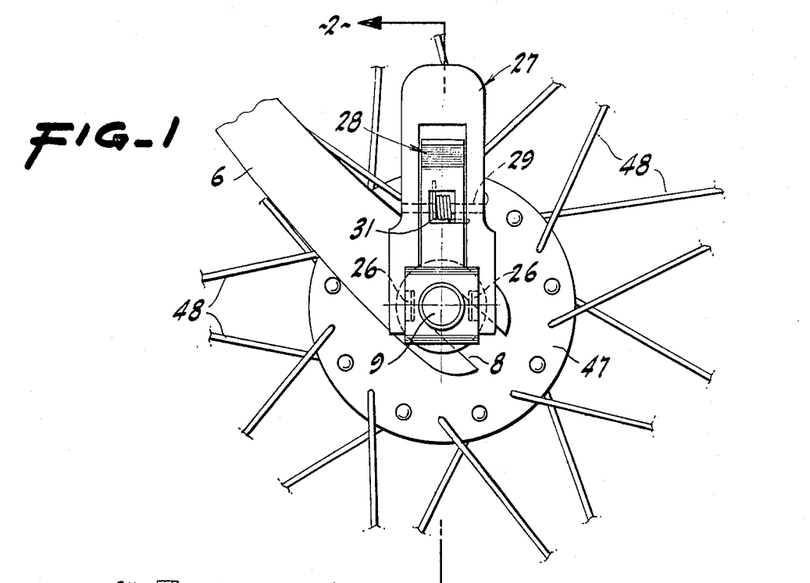
FIG. 1 is an end elevation of a bicycle hub construction pursuant to our invention, portions being broken away to reduce the size of the figure.
Figure 2:
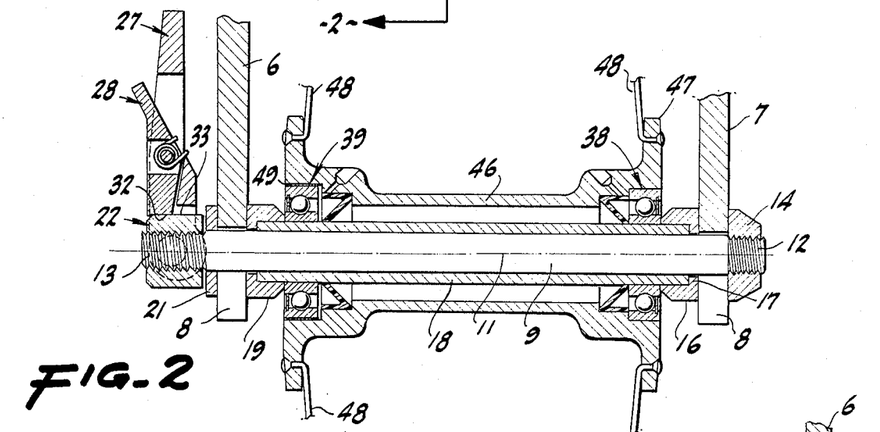
FIG. 2 is a cross-section, the plane of which is indicated by the line 2—2 of FIG. 1.
Figure 3:
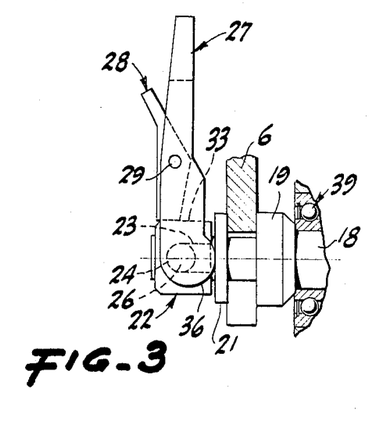
FIG. 3 is a side elevation of a portion of a retaining mechanism, some adjacent parts being shown in cross-section.
Figures 4, 5:
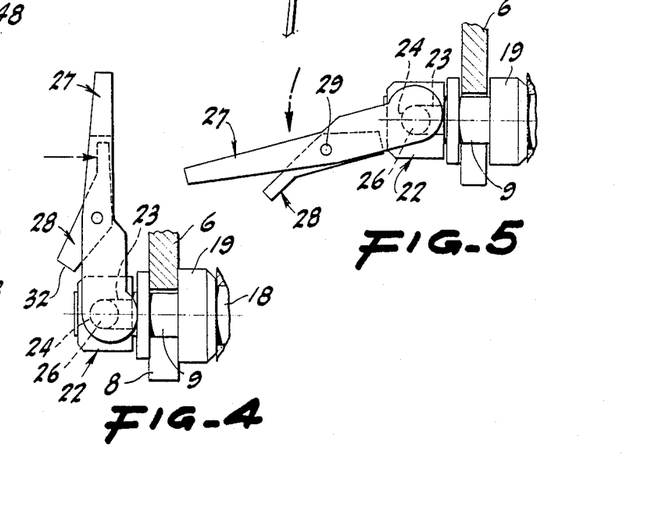
FIG. 4 is a side elevation of the retaining mechanism of FIG. 3 but with the release lever in a different position.
FIG. 5 is a side elevation of the retaining mechanism of FIGS. 3 and 4 but in a completely released position.
Figures 6, 7, 8, 9, 10:
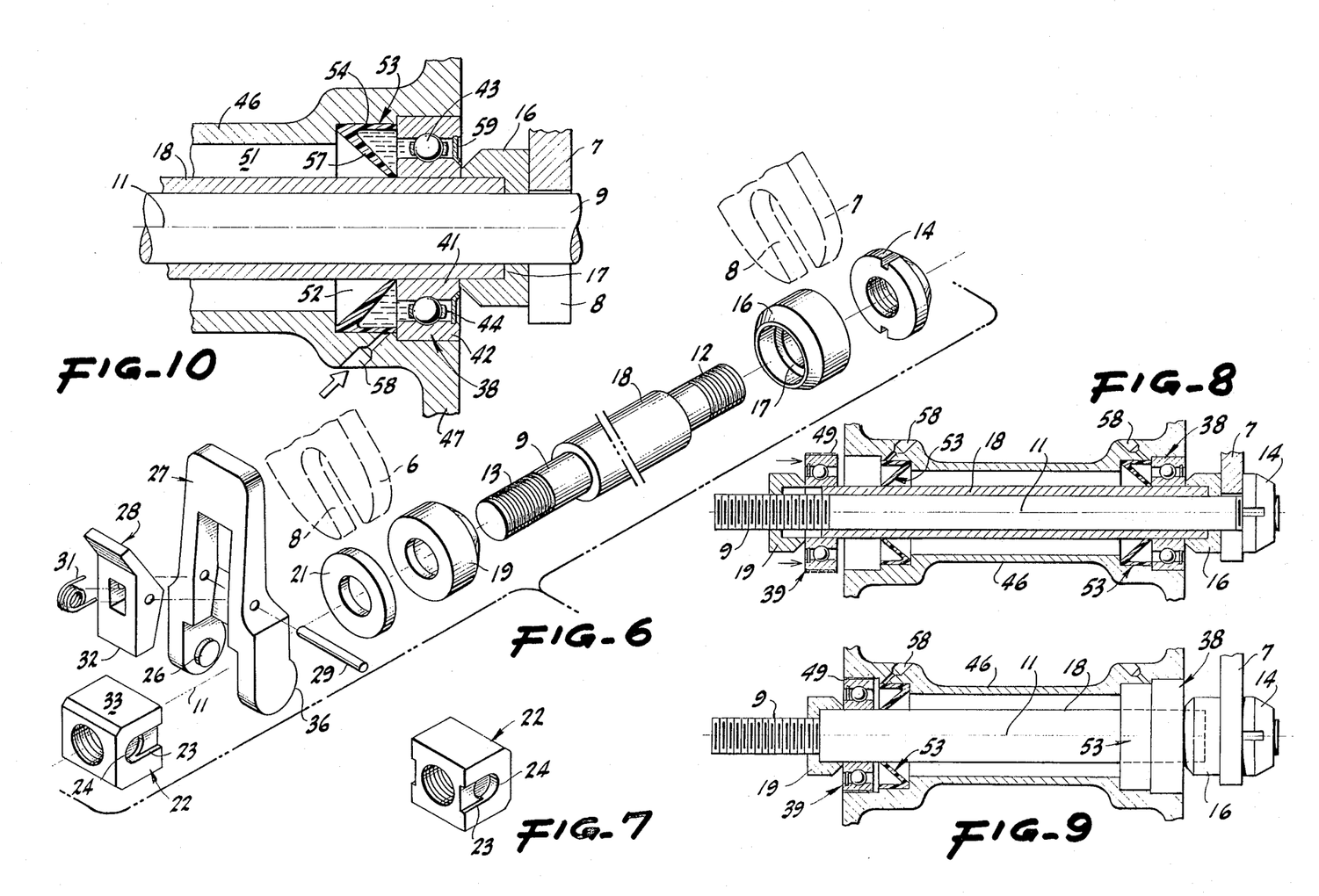
FIG. 6 is an isometric perspective view showing various parts of the hub construction in exploded locations.
FIG. 7 is an isometric view of an end block reversed from its showing in FIG. 6.
FIG. 8 is a cross-section like FIG. 2 with some parts omitted and showing a modified structure in partially disassembled form.
FIG. 9 is a view comparable to FIG. 8 but showing the parts in assembled form.
FIG. 10 is an enlarged view of the right end of FIG. 8 and showing lubricant in position.
Figure 15:
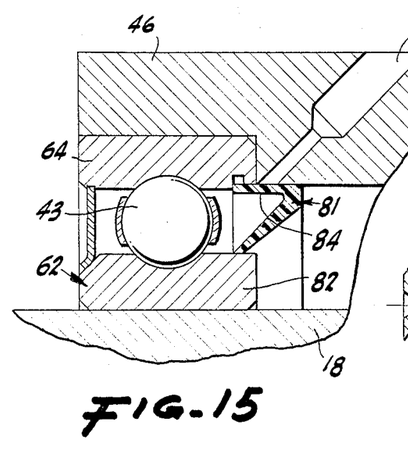
FIG. 15 is a view comparable to a part of FIG. 11 to an enlarged scale and showing a modified form of seal construction.

Another version is disclosed in FIG. 15, in which the arrangement generally is substantially the same as it is in FIGS. 2 and 10, except that the simple seal 81 instead of bearing against the tube bears against the inner race 82 of the bearing 83. The circumferential portion 84 of the seal readily acts as a flap valve for the retention of lubricant and for the introduction of lubricant through the lubricant duct 86.

Figure 16:
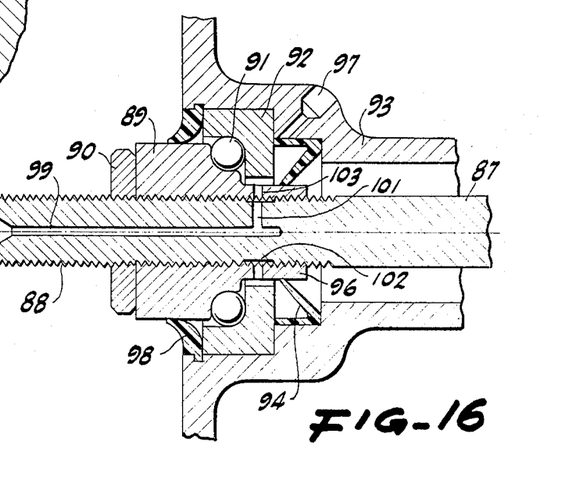
FIG. 16 is a view in cross-section comparable to the left end of FIG. 2 but disclosing a different form of bearing and seal arrangement.

In FIG. 16 there is a substantial variation. A standard, prepackaged ball bearing is not used. In this instance, the axle 87 is in general disposed as before but has an extra-long threaded end 88 onto which is positioned a threaded inner cone 89 for a bearing and for a lock nut 90. The cone is shaped to receive a number of individual balls 91 also received in an outer cone 92 pressed into a tubular housing 93. There is an inner seal 94 substantially as previously described. The inner periphery of the seal is seated on an extension 96 of the inner cone 89. The outer portion acts to admit or check lubricant furnished through an opening 97. The bearing races are closed to admission of fluids from outside by an inwardly closing, outwardly opening outer seal 98. As an additional or alternative lubricating means, the axle end 88 is provided with an axial passage 99 leading to a radial passage 101 opening into a lubricant groove 102 affording communication in any adjusted position of the inner cone 89 with a lubricant hole 103 leading to the interior of the bearing.

Figures 17, 18, 19, 20, 21, 22:
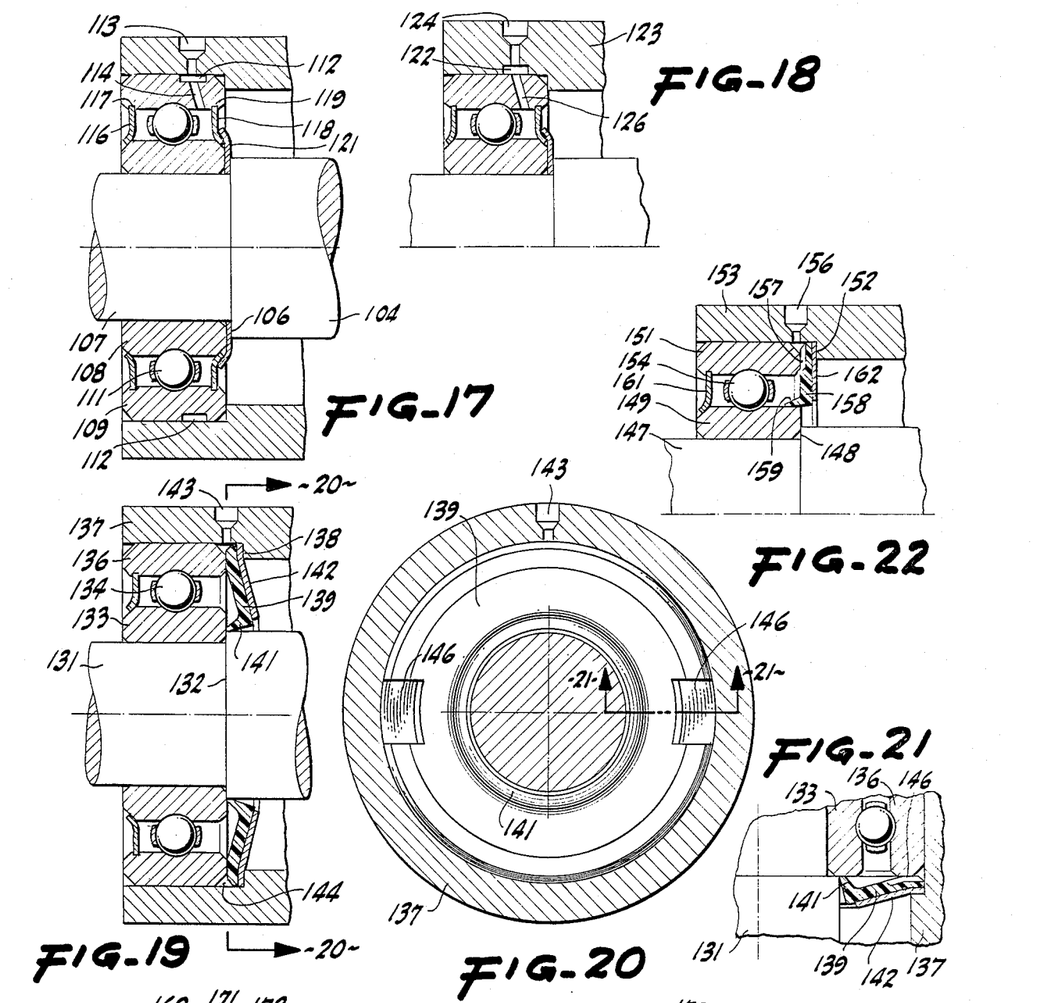
FIG. 17 is a view of the left end of a still-further modified form of axle and associated hub and bearing construction, the view being in cross-section on an axial plane.
FIG. 18 is a view like FIG. 17 but showing a modification thereof.
FIG. 19 is a view in part comparable to FIG. 17 and showing a still-further modified form of seal construction.
FIG. 20 is a cross-section, the plane of which is indicated by the lines 20—20 of FIG. 19.
FIG. 21 is a cross-section, the plane of which is indicated by the lines 21—21 of FIG. 20.
FIG. 22 is a cross-section comparable to FIG. 19 but showing a still-further modified form of construction.

In FIG. 17 is a further variation, in which an axle 104 has a shoulder 106 affording a reduced portion 107 to receive an inner race 108 coacting with an outer race 109 to hold bearing balls 111. The outer race 109 has a peripheral groove 112 communicating with a lubricant passage 113 and also communicating with a feed passage 114 leading to the space between the races 108 and 109. That space is largely sealed in part by an annular washer 116 having a seat in a groove 117 in the outer race and is also sealed by another washer 118 seated in a groove 119 in the outer race and interfitting with a washer 121 interposed between the inner race 108 and the shoulder 106 of the axle.

A variation in FIG. 18 is much like that in FIG. 17, except that instead of the groove 112, there is a groove 122 in the housing 123. The groove 122 is fed by a lubricant entry passage 124 and discharges to the interior of the bearing through a passage 126.

In FIGS. 19, 20 and 21, there is shown a still-further variation. The axle 131 has a shoulder 132 abutting the inner race 133 for a series of balls 134 confined by an outer race 136 within a housing 137 having a shoulder 138. Interposed between the outer race 136 and the shoulder 138 is a flexible seal 139 having a conical lip 141 designed to seat against the shaft 131 and also against the side of the inner race 133. The outer portion of the seal 139 is disposed between the outer race 136 and a back-up washer 142 against the shoulder 138. A lubricant entry passage 143 is provided in the housing 137 and communicates through an annular passage 144 between the outer race 136 and the corner of the seal 139 with cut-away portions 146 in the flexible seal 139. As especially shown in FIGS. 20 and 21, the incoming lubricant from the passage 143 can readily get through the passage 144 to the space around the balls 134 and between the inner and outer races. Again, the cut-away portions 146 are ninety degrees away from the entry 143.

A still-further change is illustrated in FIG. 22. An axle 147 has a shoulder 148 against which the inner race 149 of a bearing is situated. The bearing has an outer race 151 seated against a shoulder 152 in an axle housing 153. A series of balls 154 between the races 149 and 151 are lubricated through a passage 156 in the axle housing 153 and a connecting groove 157 in the face of a seal ring 158 having an inner flange 159 bearing against the outside surface of the inner race 149. The lubricant received from the passage 156 and groove 157 is confined by an outer seal ring 161 seated in the outer race and bearing against the inner race. The flexible seal ring 158 is backed up by a stiff washer 162.

Figure 23:
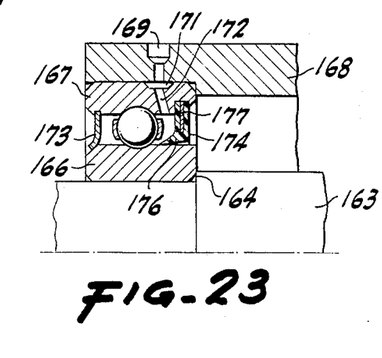
FIG. 23 is a view like FIG. 22 but showing a further modification in the construction.

A useful variation of the flexible seal construction is shown in FIG. 23. There is the usual axle 163 having a shoulder 164 against which the inner race 166 of a ball bearing abuts. The outer race 167 of the bearing is seated in a housing 168 provided with a lubricant passage 169 opening to a groove 171 in the outer race 167. A connecting passage 172 goes from the groove 171 to the space between the races 166 and 167. There is the usual outer seal annulus 173. As an inner seal, there is afforded an extra-thick flexible ring 174 having a foot 176 bearing on the outside of the inner race 166 and especially having a reinforcing washer 177 molded in. Though the ring 174 is of flexible material, it is substantially stiffened by the included washer 177.

Figure 24:
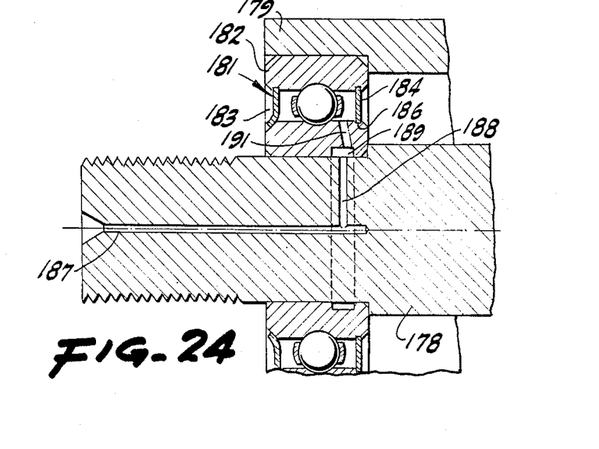
FIG. 24 is a view like FIG. 16 and showing a modified form of bearing and seal construction.

Instead of feeding the lubricant in from the housing as in preceding arrangements, there is provided an alternative arrangement, as shown in FIG. 24, in which an axle 178 runs within an outer housing 179 with an interposed bearing 181. The outer bearing race 182 carries grooves for an outer seal ring 183 and an inner seal ring 184, the latter also operating within a groove 186 in the inner race. To lubricate this structure, the axle 178 is provided with an axial bore 187 leading to a cross bore 188 communicating with a groove 189 in the interior of the inner race of the ball bearing and having a passage 191 affording communication between the groove 189 and the volume between the seals 183 and 184. With this arrangement, the user puts a lubricant tool against the end of the bore 187 and thus introduces lubricant through the bores 187 and 188 into the groove 189 and through the passage 191 into the volume surrounding the ball bearings.

Figure 25:
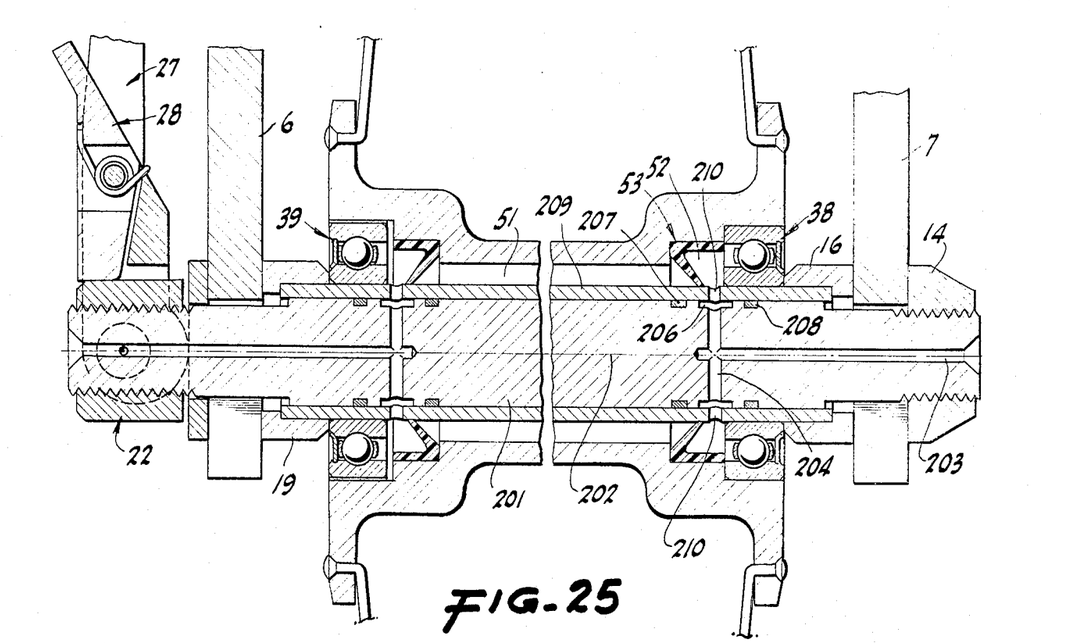
FIG. 25 is a view like FIG. 2 but with modified lubrication means.

As a variant form of a hub with a lubricant-free interior volume, we provide, as shown in FIG. 25, an axle 201 approximately as shown in FIG. 2 but internally modified. Extending inwardly from the end near the nut 14 and along the central axis 202 is a bore 203. This extends inwardly well past the ball bearing 38. A cross bore 204 intersects the bore 203 and opens into a peripheral groove 206 disposed between two sealing rings 207 and 208 in the axle. In a tube 209 coaxially surrounding the axle 201 and positioned by cups 16 and 19 abutting the forks 6 and 7, there are holes 210 opposite each other and establishing communication between the groove 206 and the space 52 within a seal 59 next to a bearing 38 adjacent one end of a housing 211 free of lubrication holes. Lubricant is introduced into the bore 203 and flows through the cross bore 204 into the groove 206 and flows from there through the holes 210 into the seal space and into the bearing 38, being confined by the sealing rings 207 and 208.

The other end of the construction, near the eccentric adjusting lever 27, is a substantially symmetrical duplicate of the nut end of the axle, so that copious lubrication is afforded, but the chamber volume 51 is kept dry.

Figure 26:
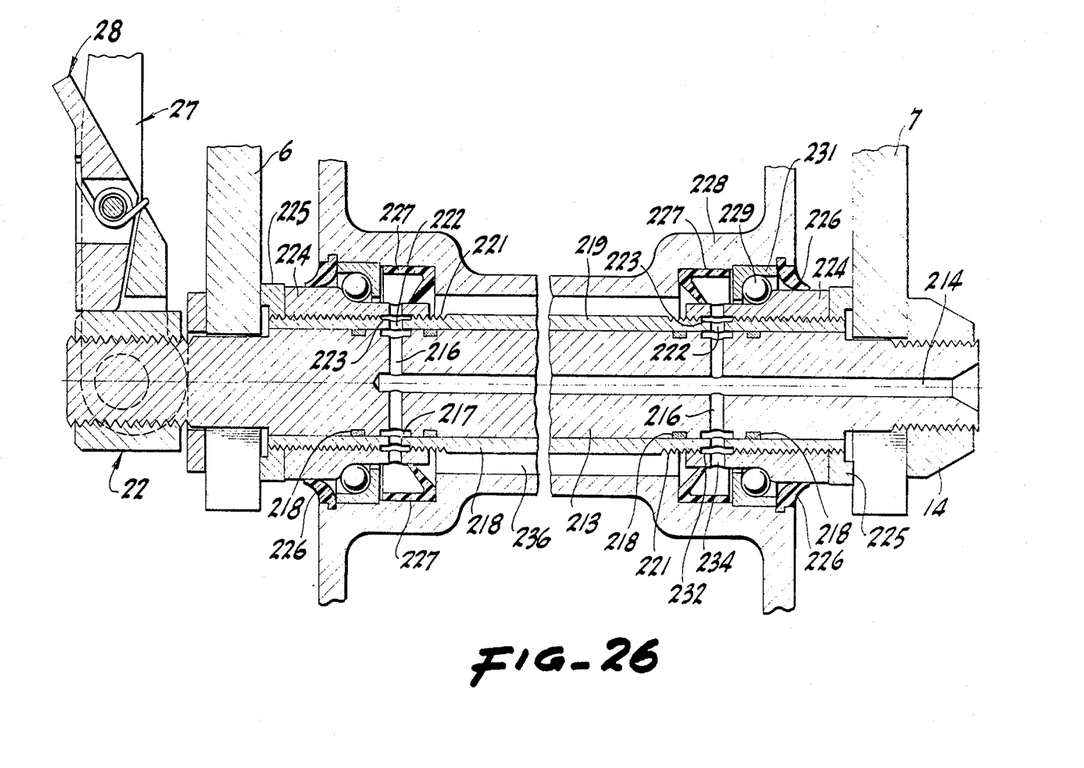
FIG. 26 is generally like FIG. 25 but with a different arrangement of modified parts.

A somewhat simplified version of the FIG. 25 form of the invention is represented in FIG. 26. Therein the axle 213 is fabricated and positioned as before, except that there is a long, axial bore 214 extending in from one end. At two locations there are cross bores 216 opening into circumferential grooves 217 isolated between pairs of packing rings 218. Surrounding the axle 213 is a tube 219 having extensive threads 221 at both ends and also having holes 222 opening into channels 223 cut into the threads 221.

Engaged with the threads at each end of the tube 219 are special nuts 224. These are secured in place by lock nuts 225 engaging the threads 221. The nuts 224 are internally threaded and externally specially formed to provide smooth outer surfaces for sealing rings 226 and 227 seated in a housing 228 on opposite sides of a ball bearing 229. This has an outer race 231 in the housing and engages an inner race formed integrally with the nut 224. Each nut 224 also has its threads interrupted by a circumferential groove 232 registering with openings 233 in the tube 219 and with openings 234 in the nut 224, so that there is a continuous lubricant path from one axle end into the spaces in both of the ball bearings to which the lubricant is confined by the seals 226 and 227, leaving the annular chamber 236 dry.

Figure 27:
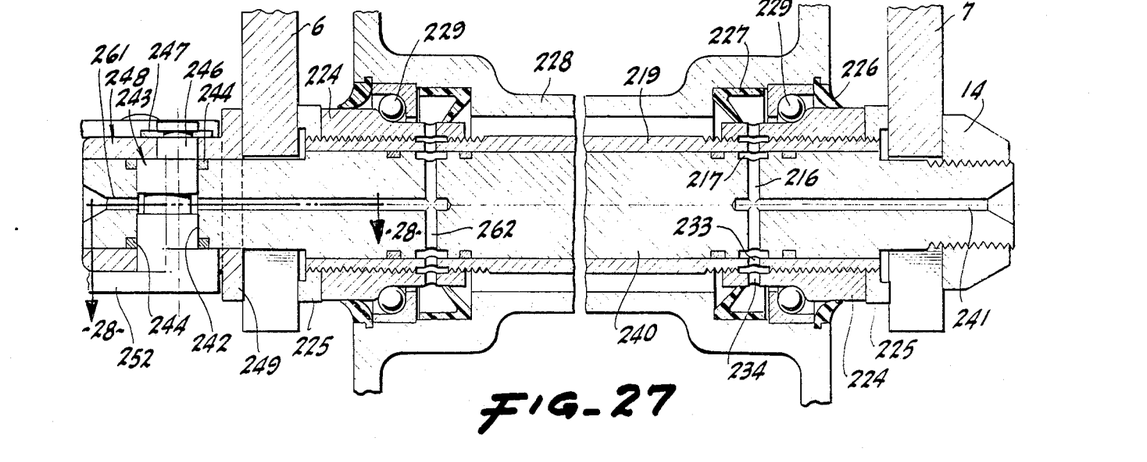
FIG. 27 is a view like FIG. 26 but with a modified lubricating arrangement and with the left end block rotated ninety degrees from the showing in FIG. 26.

The version shown in FIG. 27 is very much like that disclosed in FIG. 26, except the lubricant is supplied from both ends of the axle instead of from just one end, and the lever and nut block structure at one end of the axle is correspondingly modified. For that reason, most of the description and reference numbers applied to FIG. 26 are also used in connection with the FIG. 27 device. In the form shown in FIG. 27, an axle 240 is threaded at one end to receive a nut 14, as before, and is disposed to lie between the forks 6 and 7 along an axis. The axle 240 at one end has a short, axial bore 241, as in the FIG. 25 version, to supply lubricant through a cross bore 216 and a groove 217 through a hole 233 in a tube 219 and through a hole 234 in a nut 224 to a bearing 229 supporting one end of a housing 228.

The axle 240 at the other end is modified considerably in that it is not externally threaded at the end, but does have a cross bore 242 in which is journalled a crank shaft 243. Seals 244 make a lubricant-tight fit between the crank shaft and the axle. One end of the crank shaft 243 has a projecting, offset crank pin 246 grooved and releasably end-restrained by a C-washer 247 bearing against the face of a block 248 in which the crank pin 246 is also journalled. The block has a washer end 249 adapted to abut the side of the fork 6 and merging with flat sides 251, against one of which a hand lever 252 abuts. The hand lever and the adjacent portion of the crank shaft 243 are joined as a unit. The free end of the hand lever is enlarged to accommodate a finger ring 253 for ready manual operation.

To prevent unwanted hand lever motion, the lever 252 has an aperture 254 in which a restraining pin 256 can lodge. A bore 257 in the block 248 receives the pin 256 and a spring compressed between the head of the pin and the block 248 at the end of the bore. The pin 256 extends out of the block and is reduced and riveted to hold a stop washer 258.

In the operation of this structure, the parts in the positions illustrated in FIG. 27 hold the fork 6 tightly between the lock nut 225 on one side and the washer end 249 of the block 248.

Figures 28, 29, 30:
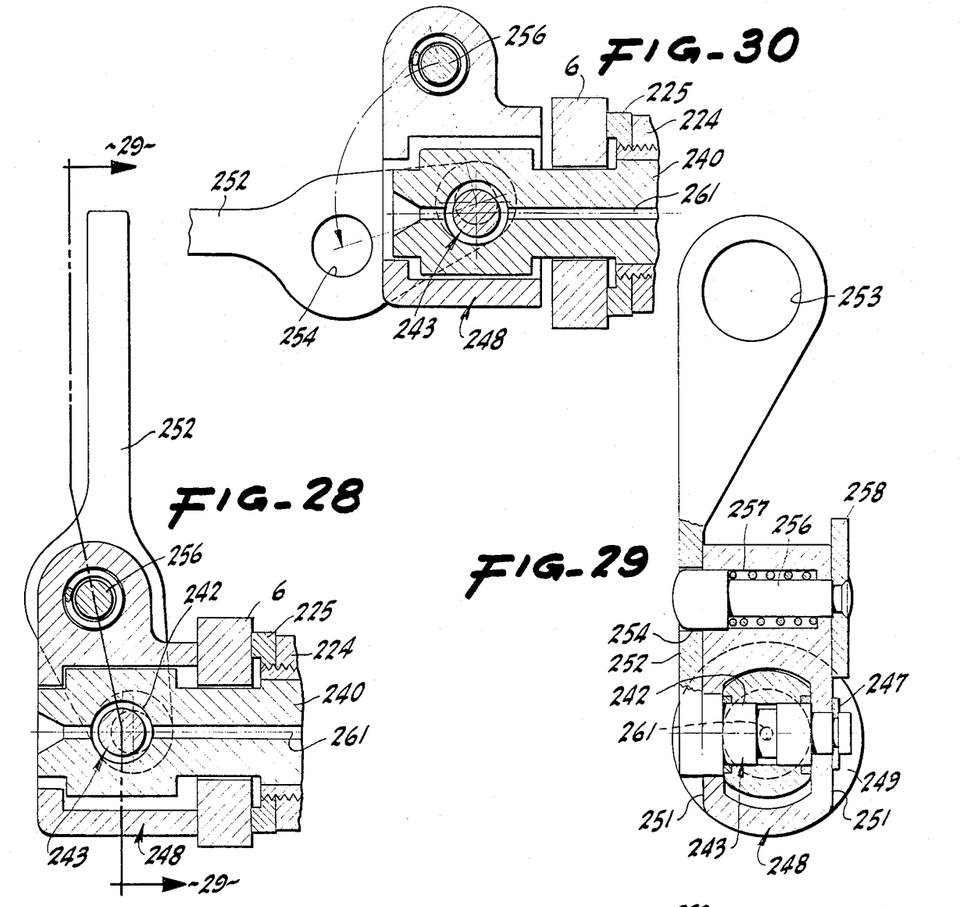
FIG. 28 is a cross-section, the plane of which is indicated by the lines 28—28 of FIG. 27.
FIG. 29 is a cross-section, the planes of which are indicated by the lines 29—29 of FIG. 28.
FIG. 30 is a view like FIG. 28 but with the control lever and associated parts in a different position.

To release the assembly as to the fork 6, the user pulls the stop washer 258 (FIG. 29) to withdraw the pin 256 from the lever 252 and, using the ring 253, rotates the lever from its FIG. 28 position into its FIG. 30 position. This motion rotates the crank shaft 243 with the eccentric crank pin 246 and so also moves the entire block 248 eccentrically to pull the washer end 249 away from the fork, as shown in FIG. 30.

Lubrication with this construction is arranged by an axial bore 261 intersecting the cross bore 242 adjacent a reduced portion of the crank shaft 243, so that there is no obstruction to fluid flow. At its inner end, the bore 261 intersects a cross bore 262 entirely comparable to the cross bore 204 in FIG. 26 and having entirely comparable surroundings and connections to which the pertinent parts of the FIG. 26 description apply.

Figure 31:
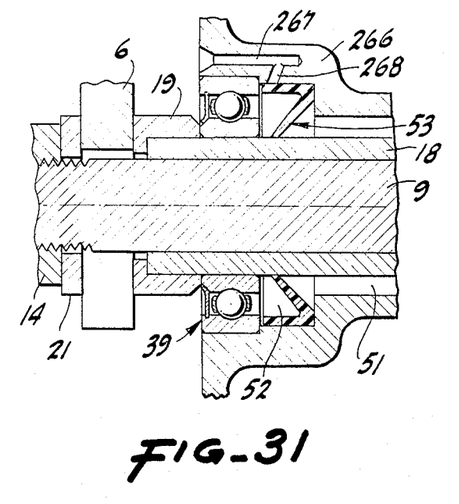
FIG. 31 is a view like FIG. 2 but with a different lubrication passage.

Instead of introducing lubricant to the bearings by working within the wheel spokes 48, as shown in FIG. 2, it is often preferred to use a construction, as in FIG. 31, in which the cylindrical housing 266 has an axially extending bore 267 open to the outside and connected to an inclined, largely radial bore 268 protected by the seal ring 53, as in FIG. 2. Again, the ring 53 acts as a flap valve to preclude outflow and to permit inflow.

Figure 32:
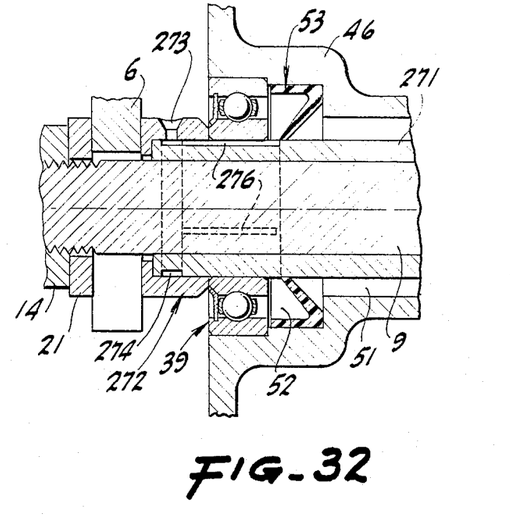
FIG. 32 is a view like FIG. 31 but with changed lubrication passages.

As a variant way of introducing lubricant without getting inside the wheel spokes, the arrangement of FIG. 32 can be employed. Herein the axle 9 is standard, going through a fork 6 at one end and carrying a washer 21 and a nut 14. Around the axle 9 is a tube 271 supporting a ball bearing 39 mounting a housing 46 carrying a seal 53.

The bearing 39 and the fork 6 are relatively positioned by a special cup 272 interposed between them and on the tube 271. In the cup rim is a lubrication passage 273 opening to a groove 274 surrounding the tube 271 and at several circumferential locations opening to longitudinal channels 276 extending inwardly of the tube and under the bearing 39 to open to the interior, annular space 52 or chamber of the seal 53. When lubricant is introduced into the passage 273, it flows into the groove 274 and along the several channels 276 into the chamber 52 of the seal 53, thus affording proper lubrication without getting into the volume 51.

Figure 33:
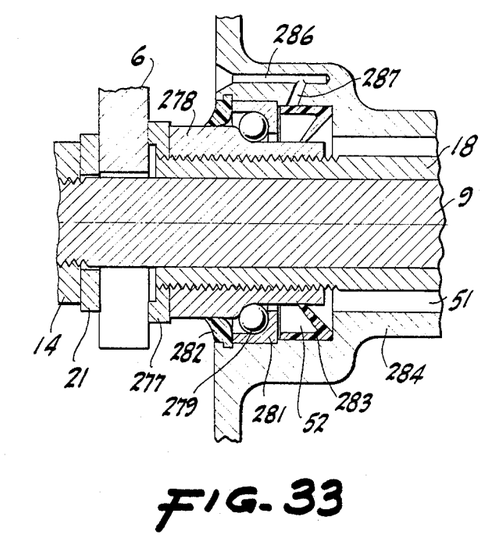
FIG. 33 is a view comparable to FIG. 21 but with a different bearing and seal arrangement.

In case cone bearings are used, a variation as shown in FIG. 33 and similar to the structures in FIGS. 31 and 26 is provided. Therein the axle 9 goes at one end through a fork 6 and is retained by a washer 21 and nut 14. On the axle 9 is a tube 18 having a threaded end and carrying a lock nut 277 abutting an elongated, internally threaded inner bearing race 278. This engages a number of bearing balls 279 also engaged by an outer race 281. The balls are protected by an annular space defined for them in part by an outer seal 282 and an inner seal 283. Both seals are mounted on opposite sides of the bearing balls in a housing 284 coaxial with the axle. An axial lubricant passage 286 is formed in the housing 284 and has a connecting lubricant passage 287 terminating against the seal 283. Normally the seal 283 blocks flow, especially outwardly, through the passages 287 and 286. But when lubricant is introduced from the outside into the passage 286, the lubricant continues through the passage 287, deflecting at least a local portion of the seal 283, and continues to the bearing balls 279 and races 278 and 281, being stopped by the seal 282.

Figure 34:
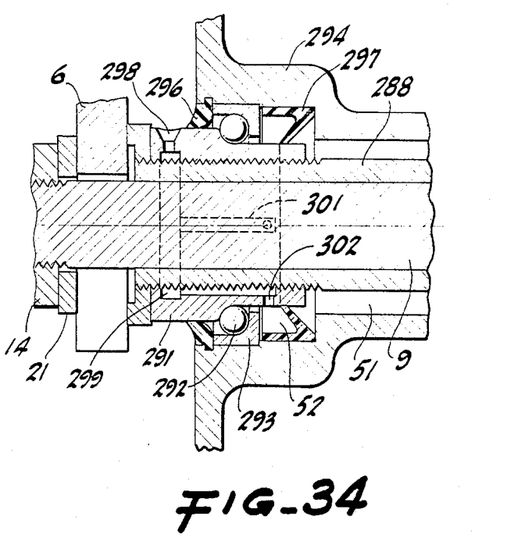
FIG. 34 is comparable to FIG. 33 but with a different lubricating arrangement.

An embodiment having resemblances to FIGS. 32 and 33 is shown in FIG. 34. There is the usual axle 9 going through a fork 6 and on its threaded end receiving a washer 21 held by a nut 14. Telescoped with the axle 9 is a tube 288 held by a lock washer 289 and retaining an inner race 291 threaded onto the tube. The inner race supports a series of bearing balls 292 partly confined by the inner race and partly confined by an outer race 293. The outer race is seated in a housing 294 and is disposed in a lubricant chamber defined by an outer seal ring 296 and an inner seal ring 297. Both the rings 296 and 297 bear upon the inner race 291. To carry lubricant to the bearing chamber, the inner race 291 has a radial passage 298 opening into an internal groove 299. The groove 299 has several axially extending channels 301 opening into it and having outlet openings 302 at their inner ends registering radially with the seal chamber 52.

With this structure, an externally available, radial lubricant entrance is afforded leading through several freeflowing paths to the bearing interior while not invading nor contaminating the volume 51.

We claim:

1. A bicycle hub construction and lubrication therefor especially for a bicycle having first and second spaced forks with openings therein comprising an axle adapted to extend through said openings and having threaded ends, a tube disposed around said axle and spaced from said forks, a pair of spaced-apart ball bearings each having an inner race engaging said tube and an outer race, a tubular housing surrounding said axle and having spoke-receiving end flanges, means on said housing adjacent said end flanges for engaging the outer races of said ball bearings, means on said housing providing a pair of end chambers each with a shoulder adjacent a respective one of said ball bearings, a pair of circular seals each having an annular band disposed between one of said shoulders and the outer race of one of said ball bearings and each having a conical portion integral with said band adjacent said one of said shoulders and extending into contact with said tube at spaced locations leaving a volume between said seals, means including passages through the wall of said tubular housing and overlain by said seals for admitting lubricant to said end chambers, a pair of cups each having a shoulder disposed between a respective end of said tube and a respective one of said forks and having a cylindrical portion surrounding said respective end of said tube, a nut engaging one threaded end of said axle and near said first fork, a bearing washer around the other end of said axle and abutting said second fork, a nut block engaging the other threaded end of said axle, means defining transversely disposed bearing shoulders on opposite sides of said nut block, a yoke having a pair of fingers, a bearing pin on each of said fingers adapted to engage a respective one of said bearing shoulders, means on each of said fingers defining cams eccentric to said bearing pins and adapted to engage said bearing washer, a latch lever, means for pivoting said latch lever on said yoke between said fingers for movement of said latch lever into and out of engagement with said nut block, and means for urging said latch lever into engagement with said nut block.

2. A bicycle hub for a bicycle having spaced forks with openings therein comprising an axle adapted to extend through said openings and having ends with threads, a tube surrounding said axle and having ends between said forks, cup washers each having one portion surrounding a respective end of said tube and having a flange interposed between a respective end of said tube and a respective one of said forks, a nut adapted to engage said threads on one of said ends outside the adjacent one of said forks, a threaded block adapted to engage said threads on the other of said ends outside the other one of said forks, a washer on said axle and interposed between said block and said other one of said forks, a lever, means for pivoting said lever on said block to rotate about an axis extending transversely of said axle, a cam on said lever adapted to move against and away from said washer as said lever rotates, and a detent movable on said lever into and out of a position engaging said block for precluding rotation of said lever about said axis.

3. A bicycle hub for a bicycle having spaced forks with openings therein comprising an axle adapted to extend through said openings and having ends with threads, a tube surrounding said axle and having ends between said forks, cup washers each having one portion surrounding a respective end of said tube and having a flange interposed between a respective end of said tube and a respective one of said forks, a nut adapted to engage said threads on one of said ends outside the adjacent one of said forks, a threaded block adapted to engage said threads on the other of said ends outside the other one of said forks, a washer on said axle and interposed between said block and said other one of said forks, a lever, means for pivoting said lever on said lock to rotate about an axis extending transversely of said axle, a cam on said lever adapted to move against and away from said washer as said lever rotates, and a detent movable on said lever into and out of a position engaging said block for precluding rotation of said lever about said axis, and a spring for urging said detent into said position engaging said block.

* * * * *